United States Patent
Kim et al.

(10) Patent No.: US 11,735,753 B2
(45) Date of Patent: Aug. 22, 2023

(54) HIGH-VOLTAGE JUNCTION UNIT OF FUEL CELL SYSTEM AND POWER SUPPLY OF FUEL CELL SYSTEM INCLUDING THE SAME

(71) Applicants: HYUNDAI MOTOR COMPANY, Seoul (KR); KIA CORPORATION, Seoul (KR)

(72) Inventors: Ju Han Kim, Yongin-si (KR); Woo Young Lee, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 149 days.

(21) Appl. No.: 17/337,816

(22) Filed: Jun. 3, 2021

(65) Prior Publication Data

US 2022/0209268 A1 Jun. 30, 2022

(30) Foreign Application Priority Data

Dec. 30, 2020 (KR) .................. 10-2020-0187718

(51) Int. Cl.
*H01M 8/04858* (2016.01)
*H01M 8/04007* (2016.01)
*H01M 8/04701* (2016.01)
*H02J 7/00* (2006.01)

(52) U.S. Cl.
CPC ... *H01M 8/04932* (2013.01); *H01M 8/04037* (2013.01); *H01M 8/04701* (2013.01); *H01M 8/04947* (2013.01); *H01M 2250/20* (2013.01); *H02J 7/0063* (2013.01)

(58) Field of Classification Search
CPC ......... H01M 2250/20; H01M 8/04037; H01M 8/04701; H01M 8/0493; H01M 8/0494; H01M 8/04947; H02J 7/0063
See application file for complete search history.

(56) References Cited

U.S. PATENT DOCUMENTS

2015/0270565 A1* 9/2015 Song ................. H01M 8/04225
165/80.4

FOREIGN PATENT DOCUMENTS

KR 20090132031 A1 * 12/2009 .......... H01M 8/2465

OTHER PUBLICATIONS

Machine Translation KR20090132031A (Year: 2009).*

* cited by examiner

*Primary Examiner* — Victoria H Lynch
(74) *Attorney, Agent, or Firm* — Morgan, Lewis & Bockius LLP

(57) ABSTRACT

A fuel cell system power supply includes: a fuel cell stack configured to react hydrogen and oxygen in air with each other in order to generate electricity; a high-voltage converter configured to boost output power of the fuel cell stack; and a high-voltage junction unit configured to transmit the output power of the fuel cell stack to the high-voltage converter and to receive high-voltage power from the high-voltage converter. The high-voltage junction unit has a structure configured to simultaneously accommodate an output terminal of the fuel cell stack and an input terminal of the high-voltage converter. Consequently, the assembly structure of the high-voltage junction unit may be simplified, whereby productivity may be improved. In addition, maintainability may be improved, whereby it is possible to efficiently maintain a fuel cell vehicle.

13 Claims, 10 Drawing Sheets

HIGH-VOLTAGE JUNCTION UNIT OF FUEL CELL SYSTEM AND POWER SUPPLY OF FUEL CELL SYSTEM INCLUDING THE SAME

CROSS-REFERENCE TO RELATED APPLICATION

This application claims the benefit of Korean Patent Application No. 10-2020-0187718, filed on Dec. 30, 2020 in the Korean Intellectual Property Office, which is hereby incorporated by reference as if fully set forth herein.

TECHNICAL FIELD

The present disclosure relates to a high-voltage junction unit of a fuel cell system and a power supply of the fuel cell system including the same, and more particularly, to a power supply having input and output terminals of a fuel cell stack and a converter provided at a high-voltage junction unit.

BACKGROUND

As is known, in a vehicle equipped with a fuel cell system, reaction gases, e.g., hydrogen used as a fuel and air including oxygen used as an oxidant, are supplied to a fuel cell stack to generate electricity, using which a driving motor is operated to drive the vehicle.

To this end, the fuel cell system includes a fuel cell stack configured to generate electrical energy through electrochemical reaction between reaction gases, a fuel processing system (FPS) configured to supply hydrogen, as a fuel, to the fuel cell stack, an air processing system (APS) configured to supply air including oxygen, as an oxidant, necessary for electrochemical reaction to the fuel cell stack, and a thermal management system (TMS) configured to discharge heat, as a byproduct of the electrochemical reaction in the fuel cell stack, to the outside to optimally control operating temperature of the fuel cell stack and to perform a water management function.

The fuel cell vehicle includes a driving motor configured to drive the vehicle and an electric storage means (a supercapacitor or a battery), as an auxiliary power source, in addition to the fuel cell system. The electric storage means stores electricity generated by a fuel cell. The electricity generated by the fuel cell or the electricity stored in the electric storage means is used to operate the driving motor.

In equipping the vehicle with the fuel cell stack and parts related thereto, the driving motor (including a decelerator), a power distribution unit (PDU), a motor control unit (MCU), and the like, there are many things to be considered.

First, a narrow space problem must be solved, the number of simple mounting parts must be minimized in order to achieve weight and cost reduction, and a disposition structure that is more advantageous in terms of layout and space utilization must be considered.

In addition, since a large number of parts are mounted in a small space, the parts must be disposed in consideration of assembly efficiency and maintainability; otherwise a problem of inefficiency may occur in terms of vehicle productivity and maintenance.

For example, each of output current of a fuel cell stack and output current of a high-voltage converter is high current of several hundred amperes. In the case in which power connection between parts is performed by wiring, therefore, the following problems may occur.

First, a plurality of connectors and cables must be provided, whereby the distance between parts may be set to be long. That is, connectors must be provided at power input and output terminals of the parts, and the connectors must be connected to each other using cables. At this time, there is a minimum curvature of each cable at which the cable can be broken. In the case in which design is performed to the minimum curvature or less, excessive tension occurs, whereby assembly is difficult. After assembly, the connectors and cables may be mechanically damaged due to tension applied thereto.

Second, in the case in which current exceeds allowable current of the connectors and the cables, a plurality of connectors/cables must be provided. As a result, power connection construction is complicated, whereby assembly efficiency is deteriorated. In addition, weight and volume increase due to an increase in number of parts.

Third, in the case in which voltages used by electrical loads are different from each other, a plurality of output terminals must be provided at the fuel cell stack, which is a power supply source, and a plurality of input terminals must also be provided at a high-voltage junction unit, whereby structure is very complicated.

The information included in this Background section is only for enhancement of understanding of the general background of the present disclosure and may not be taken as an acknowledgement or any form of suggestion that this information forms the prior art already known to a person skilled in the art.

SUMMARY

The present disclosure is directed to a high-voltage junction unit of a fuel cell system and a power supply of the fuel cell system including the same that substantially obviate one or more problems due to limitations and disadvantages of the related art.

An object of the present disclosure is to provide a fuel cell system power supply, the assembly structure of which is simplified, whereby productivity is improved.

Another object of the present disclosure is to provide a fuel cell system power supply, maintainability of which is improved.

A further object of the present disclosure is to provide a fuel cell system power supply, maintenance of which is efficiently performed.

Objects of the present disclosure devised to solve the problems are not limited to the aforementioned object, and other unmentioned objects will be clearly understood by those skilled in the art based on the following detailed description of the present disclosure.

A high-voltage junction unit of a fuel cell system according to the present disclosure is characterized in that input and output terminals of a stack and a converter are integrally provided at the high-voltage junction unit, to and from which a cover is frequently attached and detached for maintenance and replacement of internal parts.

To achieve these objects and other advantages and in accordance with the purpose of the disclosure, as embodied and broadly described herein, a high-voltage junction unit of a fuel cell system includes: a fuel cell output terminal receiving recess on a first surface, such that an output terminal of a fuel cell stack extends into the fuel cell output terminal receiving recess; a high-voltage converter input terminal receiving recess on a second surface perpendicular to the first surface so as to be adjacent to the fuel cell output terminal receiving recess, such that an input terminal of a high-voltage converter extends into the high-voltage converter input terminal receiving recess; and a high-voltage converter output terminal receiving recess on the second surface so as to be spaced apart from the high-voltage converter input terminal receiving recess by a predetermined distance, such that an output terminal of the high-voltage converter extends into the high-voltage converter output terminal receiving recess.

The high-voltage junction unit may include a first circuit portion configured to use output power of the fuel cell stack and a second circuit portion configured to use output power of the high-voltage converter.

The input terminal of the high-voltage converter may be directly connected to the output terminal of the fuel cell stack in the fuel cell output terminal receiving recess.

The fuel cell output terminal receiving recess may further receive an input terminal of a first load connected to the first circuit portion.

The first load may include a stack end cell heater.

An input terminal of the stack end cell heater may be directly connected to the output terminal of the fuel cell stack in the fuel cell output terminal receiving recess.

The second circuit portion may supply power necessary for a driving motor, a blower power control unit, a coolant supply pump, and an air compressor.

In another aspect of the present disclosure, a fuel cell system power supply includes a fuel cell stack configured to react hydrogen and oxygen in air with each other in order to generate electricity, a high-voltage converter configured to boost output power of the fuel cell stack, and a high-voltage junction unit configured to transmit the output power of the fuel cell stack to the high-voltage converter and to receive high-voltage power from the high-voltage converter, wherein the high-voltage junction unit has a structure configured to simultaneously receive an output terminal of the fuel cell stack and an input terminal of the high-voltage converter.

The output terminal of the fuel cell stack and the input terminal of the high-voltage converter may be inserted into the high-voltage junction unit in a vertical direction and may be directly connected to each other.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure.

DETAILED DESCRIPTION

Figure 1:
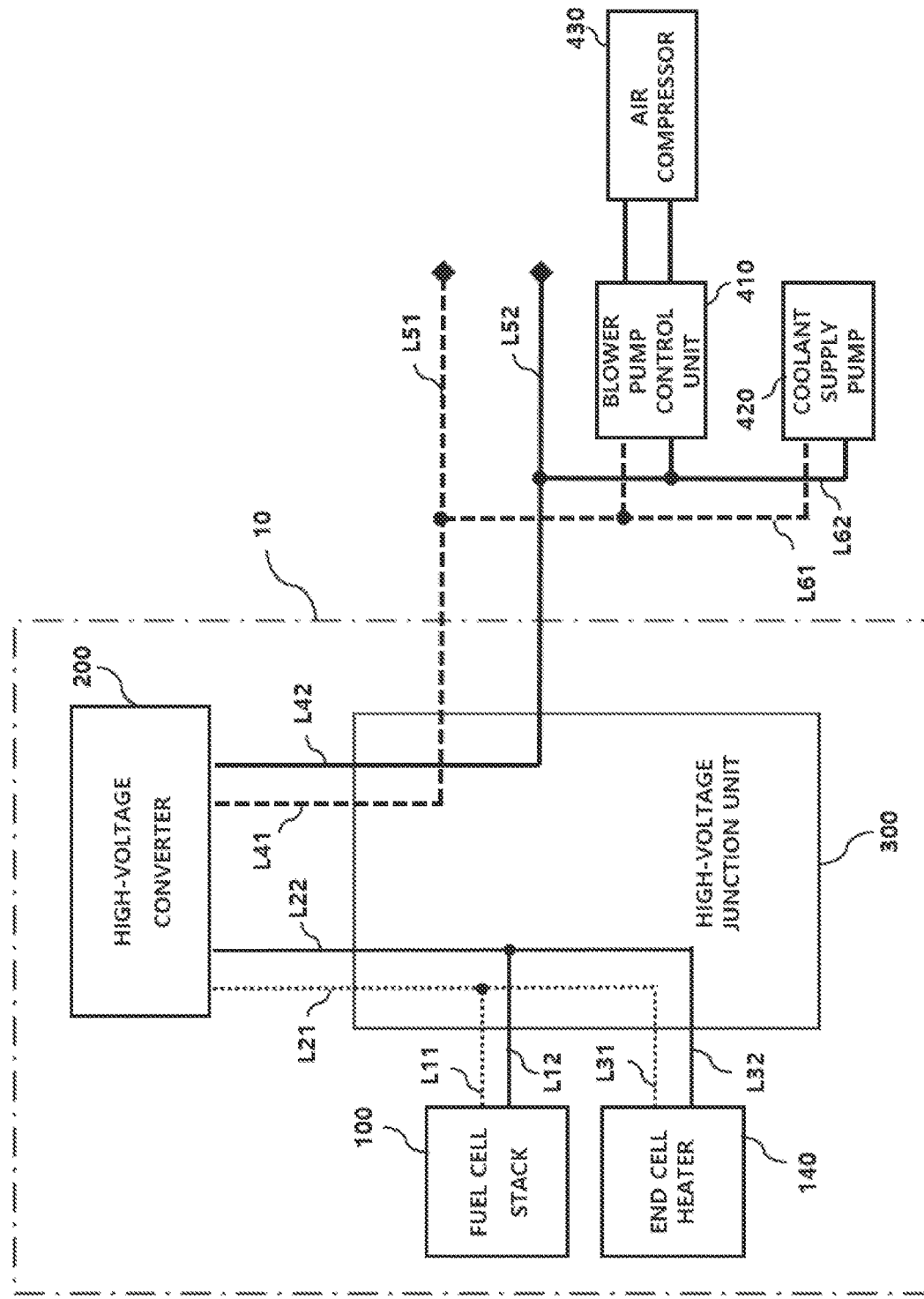
FIG. 1 is an illustrative view schematically showing Powernet topology of a fuel cell system according to the present disclosure.

Specific structural or functional descriptions of the embodiments of the present disclosure disclosed in this specification are given only for illustrating embodiments of the present disclosure. Embodiments of the present disclosure may be realized in various forms, and should not be interpreted to be limited to the embodiments of the present disclosure disclosed in this specification.

Since the embodiments of the present disclosure may be variously modified and may have various forms, specific embodiments will be shown in the drawings and will be described in detail in this specification. However, the embodiments according to the concept of the present disclosure are not limited to such specific embodiments, and it should be understood that the present disclosure includes all alterations, equivalents, and substitutes that fall within the idea and technical scope of the present disclosure.

It will be understood that, although the terms "first", "second", etc. may be used herein to describe various elements, corresponding elements should not be understood to be limited by these terms, which are used only to distinguish one element from another. For example, within the scope defined by the present disclosure, a first element may be referred to as a second element, and similarly, a second element may be referred to as a first element.

It will be understood that, when a component is referred to as being "connected to" or "coupled to" another component, it may be directly connected to or coupled to the other component, or intervening components may be present. In contrast, when a component is referred to as being "directly connected to" or "directly coupled to" another component, there are no intervening components present. Other terms that describe the relationship between components, such as "between" and "directly between" or "adjacent to" and "directly adjacent to", must be interpreted in the same manner.

The terms used in this specification are provided only to explain specific embodiments, but are not intended to restrict the present disclosure. A singular representation may include a plural representation unless it represents a definitely different meaning from the context. It will be further understood that the terms "comprises", "has" and the like, when used in this specification, specify the presence of stated features, numbers, steps, operations, elements, components or combinations thereof, but do not preclude the presence or addition of one or more other features, numbers, steps, operations, elements, components, or combinations thereof.

Unless otherwise defined, all terms, including technical and scientific terms, used in this specification have the same meanings as those commonly understood by a person having ordinary skill in the art to which the present disclosure pertains. It will be further understood that terms, such as those defined in commonly used dictionaries, should be interpreted as having meanings consistent with their meanings in the context of the relevant art and the present disclosure, and are not to be interpreted in an idealized or overly formal sense unless expressly so defined herein.

In the case in which a certain embodiment is differently realized, a function or operation specified in a specific block may be performed differently from the sequence specified in a flowchart. For example, two continuous blocks may be substantially simultaneously performed, or the blocks may be performed in reverse order depending on related functions or operations.

FIG. 1 is an illustrative view schematically showing Power-net topology of a fuel cell system according to the present disclosure. As shown, a power supply 10 of the fuel cell system according to the present disclosure includes a fuel cell stack 100, a high-voltage converter 200, and a high-voltage junction unit 300.

The fuel cell stack 100 reacts hydrogen and oxygen in air with each other to generate electricity having a voltage of about 348 to 640V. The high-voltage converter 200 boosts the output of the fuel cell stack 100. The high-voltage junction unit 300 transmits the output power of the fuel cell stack 100 to the high-voltage converter 200, and receives high-voltage power from the high-voltage converter 200.

The electricity from the fuel cell stack 100 is output through fuel cell output lines L11 and L12 and is input to the converter 200 through converter input lines L21 and L22. In addition, the electricity from the fuel cell stack 100 is transmitted to a stack end cell heater 140 through input lines L31 and L32 so as to be used as power necessary to operate the stack end cell heater 140.

First high-voltage power input to the converter 200 through the converter input lines L21 and L22 has a voltage of about 600V. The high-voltage converter 200 converts the first high-voltage power of about 600V into second high-voltage power having a voltage of about 800V through a direct current-direct current boosting method, and outputs the second high-voltage power through output lines L41 and L42.

The second high-voltage power boosted by the high-voltage converter 200 is transmitted to the high-voltage junction unit 300, and is provided to a first load and a second load through first load lines L51 and L52 and second load lines L61 and L62, respectively.

The second high-voltage power transmitted through the first load lines L51 and L52 is transmitted to a first load device requiring a high amount of power, e.g. a driving motor. The second high-voltage power transmitted through the second load lines L61 and L62 is transmitted to a first load device requiring a relatively low amount of power, e.g. a blower power control unit 410 and a coolant supply pump 420.

Figure 2:
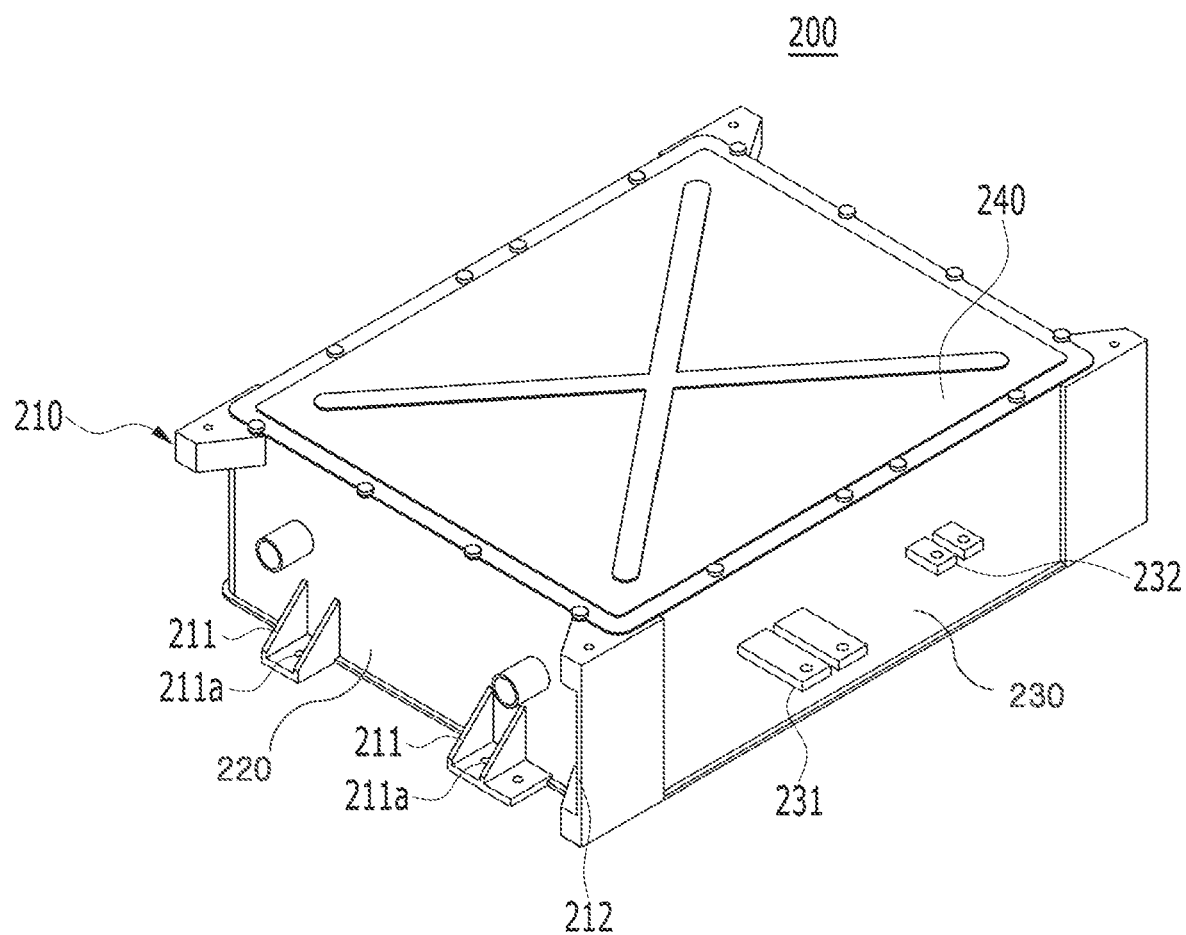
FIG. 2 is a perspective view schematically showing a high-voltage converter of a fuel cell system power supply according to the present disclosure.

FIG. 2 is a perspective view schematically showing the high-voltage converter 200 of the fuel cell system power supply according to the present disclosure. As shown, a converter input terminal portion 231 and a converter output terminal portion 232 are formed at a first surface S21 of a body 210 of the high-voltage converter 200. A cover 240 configured to protect an internal circuit is provided at the upper surface of the high-voltage converter 200.

A plurality of first connection portions 211, each having a connection recess 211a, configured to connect the body 210 of the high-voltage converter 200 to the fuel cell stack 100 is provided at a second surface S22 of the high-voltage converter 200, which is connected to the first surface S21. A second connection portion 212 for connection with the high-voltage junction unit 300 is provided at the corner between the first surface S21 and the second surface S22.

Figure 3:
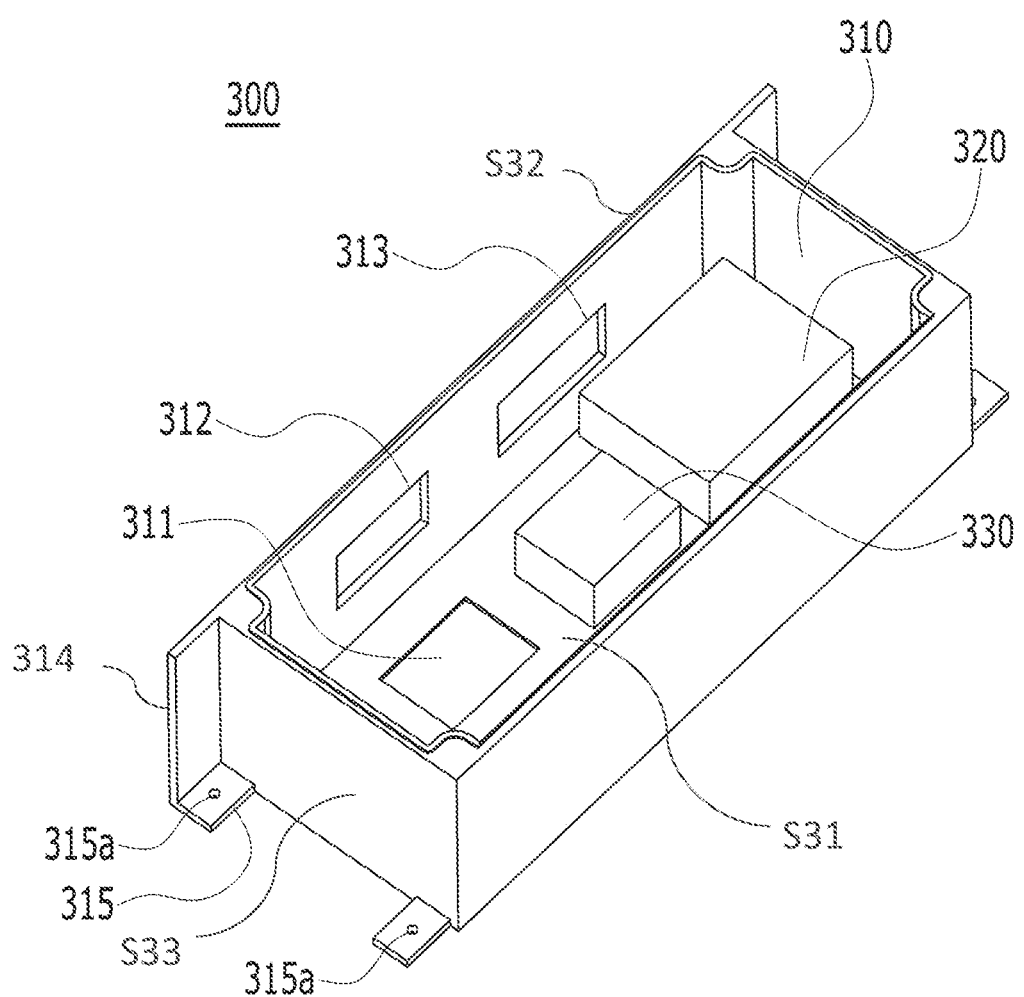
FIG. 3 is a perspective view schematically showing a high-voltage junction unit of the fuel cell system power supply according to the present disclosure.

FIG. 3 is a perspective view schematically showing the high-voltage junction unit of the fuel cell system power supply according to the present disclosure. As shown, a first circuit portion 330 and a second circuit portion 320 are provided in a body 310 of the high-voltage junction unit 300. The first circuit portion 330 has a circuit configured to use the output power of the fuel cell stack 100 therein.

The second circuit portion 320 has a circuit configured to use the output power of the high-voltage converter therein. The second circuit portion 320 includes a circuit portion necessary to drive a driving motor, a blower power control unit, a coolant supply pump, and an air compressor of a fuel cell vehicle.

A fuel cell output terminal receiving recess 311 configured to receive an output terminal of the fuel cell stack is formed in the bottom surface S31 of the body 310 of the high-voltage junction unit 300. A high-voltage converter input terminal receiving recess 312 formed adjacent to the fuel cell output terminal receiving recess 311 and configured to receive the converter input terminal portion 231 of the high-voltage converter 200 is formed in a second surface S32, which is perpendicular to the first surface S31.

A high-voltage converter output terminal receiving recess 313 disposed spaced apart from the high-voltage converter input terminal receiving recess 312 by a predetermined distance and configured to receive the converter output terminal portion 232 is formed in the second surface S32 of the high-voltage junction unit 300.

A plurality of third connection portions 315, each having a connection recess 315a, configured to connect the body 310 of the high-voltage junction unit 300 to the fuel cell stack 100 is provided at one side of a third surface S33, which is perpendicular to the second surface S32. A fourth connection portion 314 for connection with the high-voltage converter 200 is provided at the corner between the second surface S32 and the third surface S33. Although not shown, it is natural for the high-voltage junction unit 300 to have a cover configured to protect an internal circuit.

Figure 4:
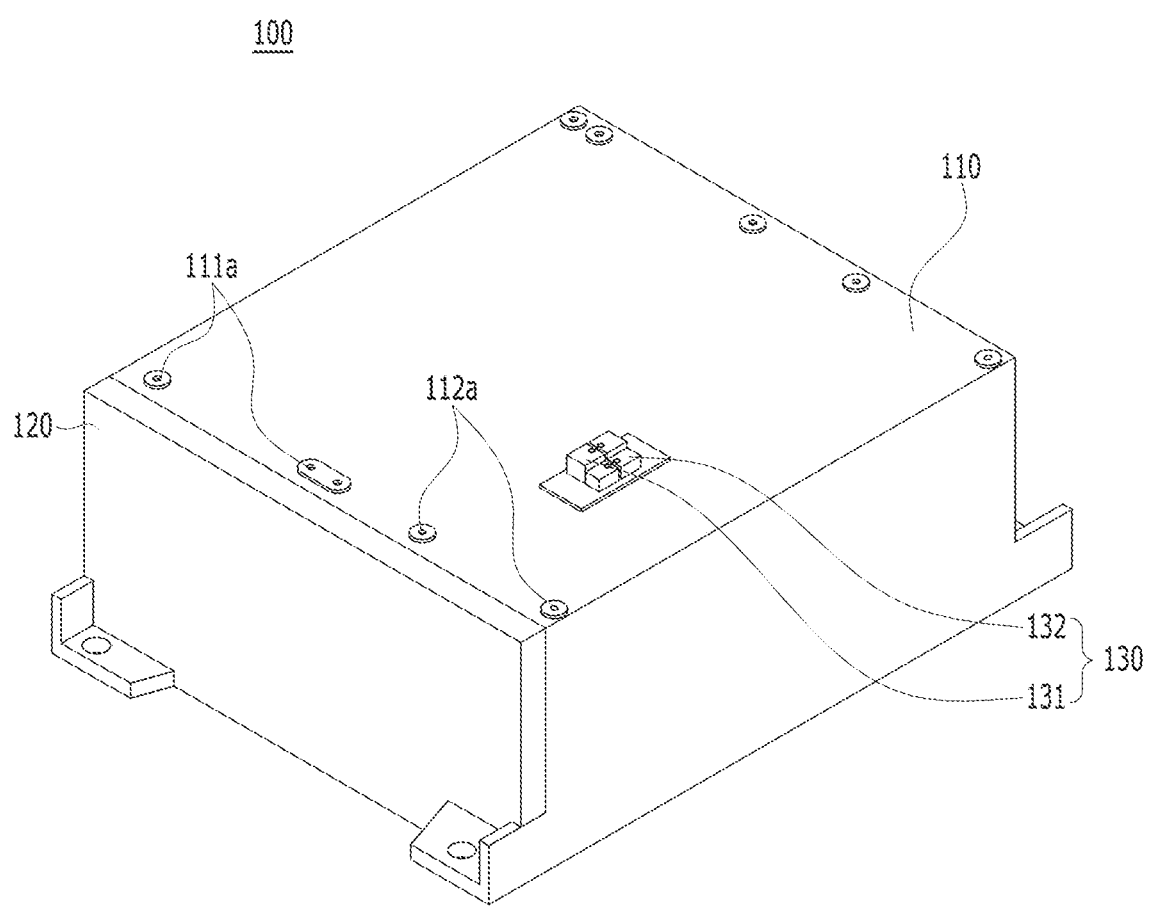
FIG. 4 is a perspective view schematically showing a fuel cell stack of the fuel cell system power supply according to the present disclosure.

FIG. 4 is a perspective view schematically showing the fuel cell stack of the fuel cell system power supply according to the present disclosure. As shown, the fuel cell stack 100 includes a body 110 and an end plate 120. A plurality of coupling recesses 111a and 112a for coupling with the high-voltage converter 200 and the high-voltage junction unit 300 is formed in the upper surface of the body 110 of the fuel cell stack 100. A terminal portion 130 formed as the result of protrusion of an output terminal 131 of the fuel cell stack 100 and a stack end cell heater input terminal 132 is provided at the upper surface of the body 110 of the fuel cell stack 100.

Figure 5:
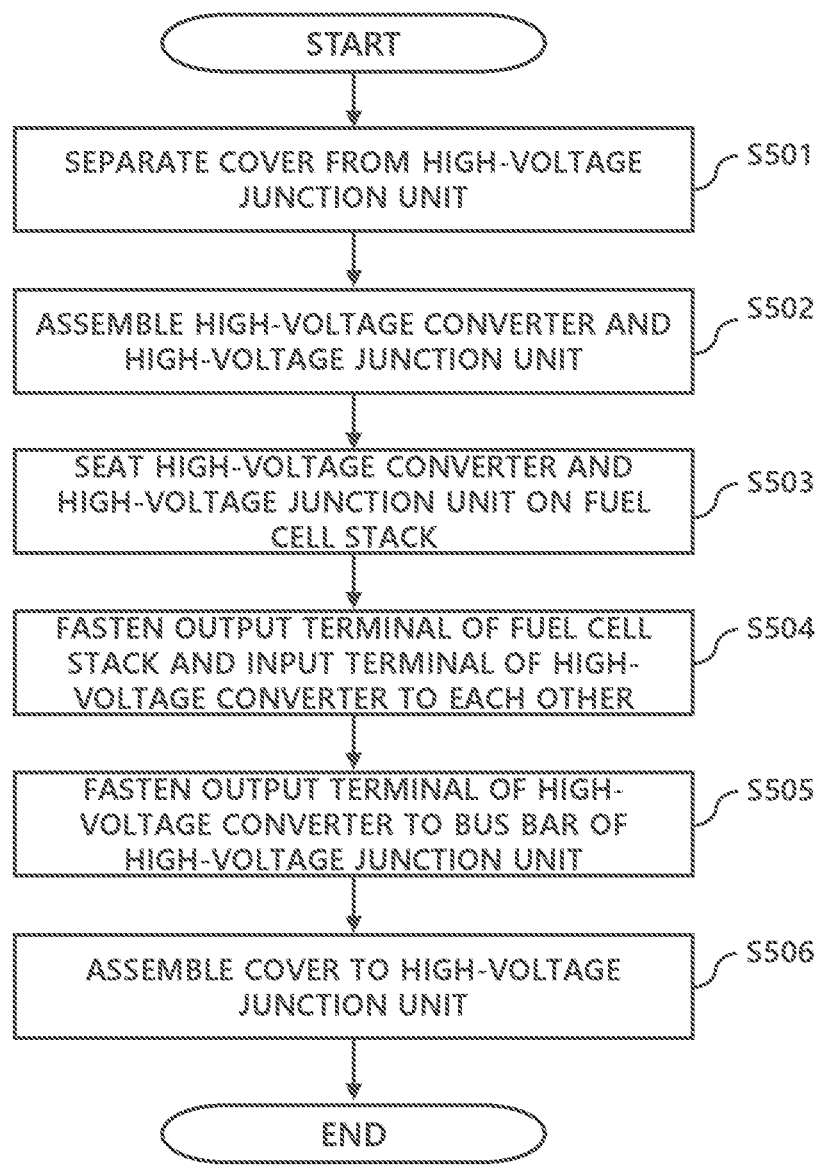
FIG. 5 is a flowchart showing a process of manufacturing the fuel cell system power supply according to the present disclosure.
Figure 6:
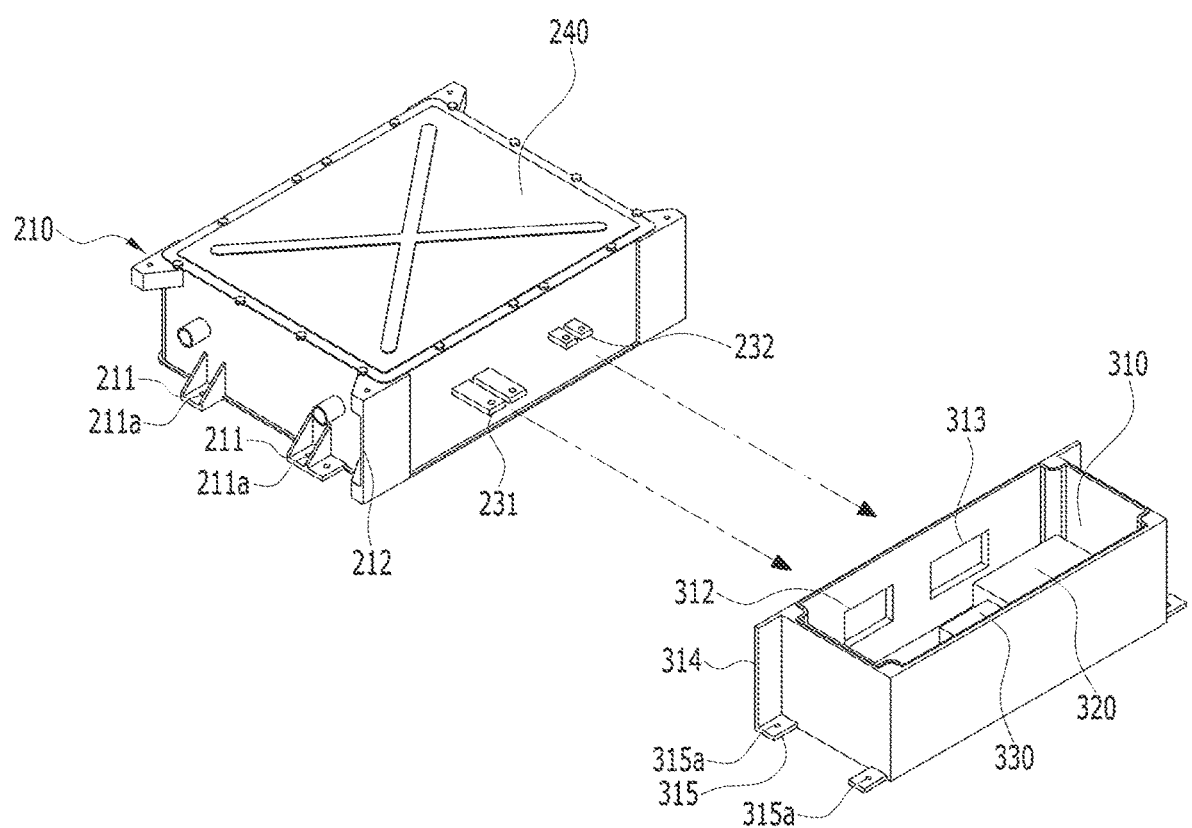
FIG. 6 is a perspective view showing a coupling relationship between the high-voltage converter and the high-voltage junction unit of the fuel cell system power supply according to the present disclosure.
Figure 7:
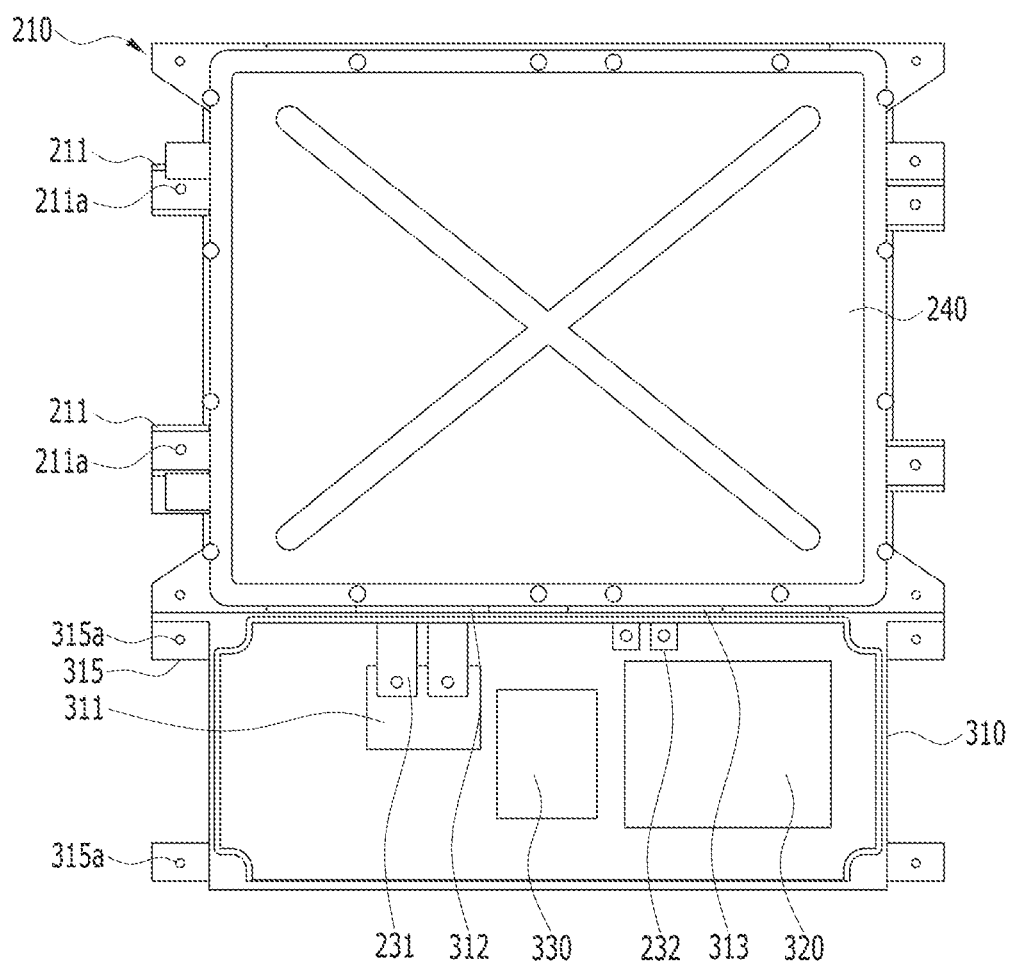
FIG. 7 is a plan view showing a coupling relationship between the high-voltage converter and the high-voltage junction unit shown in FIG. 6.

FIG. 5 is a flowchart showing a process of manufacturing the fuel cell system power supply according to the present disclosure. FIG. 6 is a perspective view showing a coupling relationship between the high-voltage converter and the high-voltage junction unit of the fuel cell system power supply according to the present disclosure, and FIG. 7 is a plan view showing a coupling relationship between the high-voltage converter and the high-voltage junction unit shown in FIG. 6. First, bolts fastened to the upper part of a cover 340 of the high-voltage junction unit 300 are removed to separate the cover from the body 310 of the high-voltage junction unit 300 (S501).

As shown in FIGS. 6 and 7, the first surface S21 of the high-voltage converter and the second surface S32 of the high-voltage junction unit 300 are coupled to each other in a horizontal direction. At this time, the converter input terminal portion 231 formed at the first surface S31 of the high-voltage converter 200 is inserted into the high-voltage converter input terminal receiving recess 312 formed in the second surface S32 of the high-voltage junction unit 300. The converter output terminal portion 232 formed at the first surface S21 of the high-voltage converter 200 is inserted into the high-voltage converter output terminal receiving recess 313 formed in the second surface S32 of the high-voltage junction unit 300. At this time, the second connection portion 212 formed at the corner of the high-voltage converter 200 is coupled to the fourth connection portion 314 of the high-voltage junction unit 300 formed at the position corresponding thereto. Various coupling methods may be used. The high-voltage converter 200 and the high-voltage junction unit 300 may be coupled to each other by bolting (S502).

Figure 8:
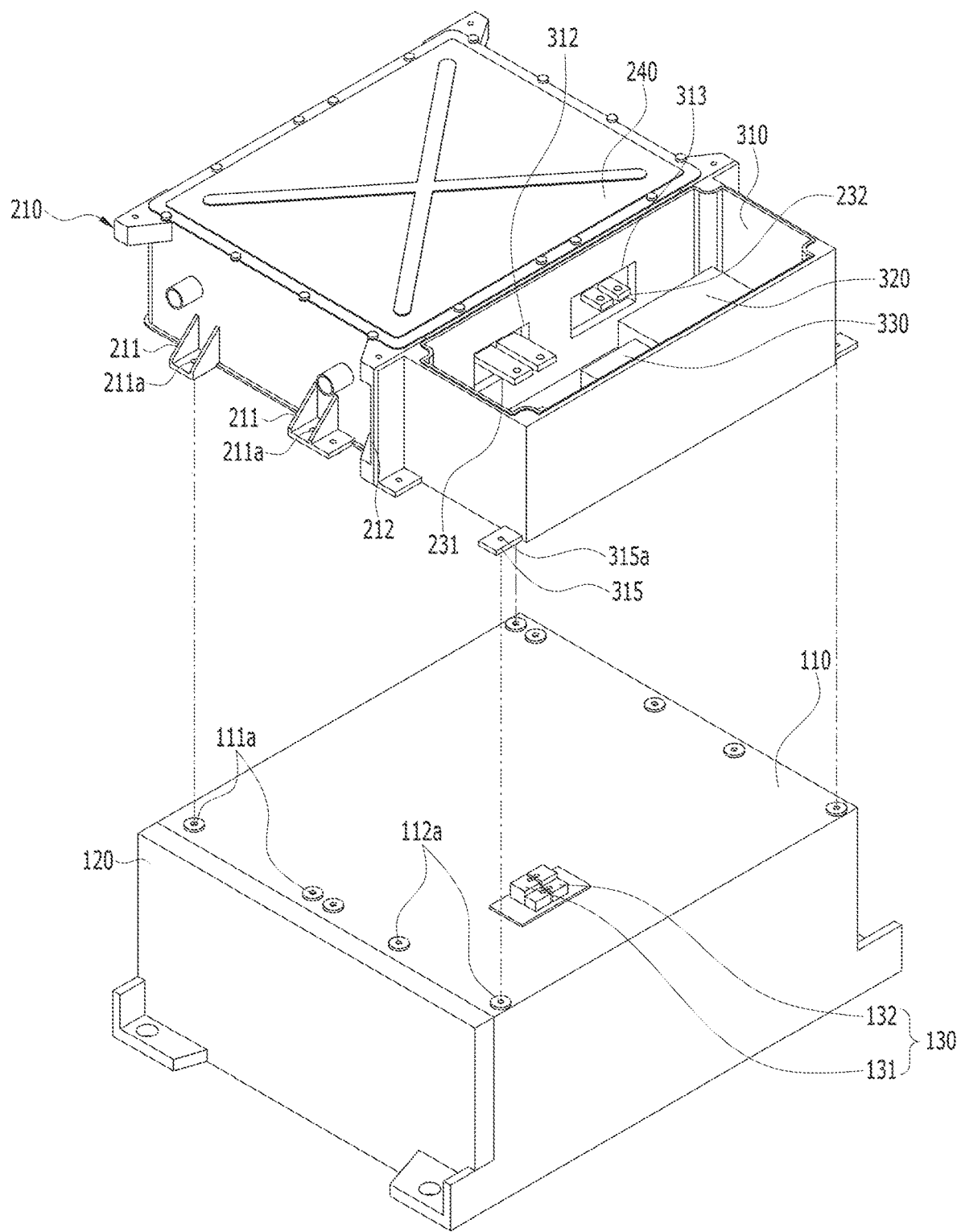
FIG. 8 is a perspective view showing the state in which the high-voltage converter and the high-voltage junction unit are coupled to the fuel cell stack in the state of being coupled to each other in the fuel cell system power supply according to the present disclosure.

FIG. 8 is a perspective view showing the state in which the high-voltage converter and the high-voltage junction unit are coupled to the fuel cell stack in the state being coupled to each other in the fuel cell system power supply according to the present disclosure. As shown, the high-voltage converter 200 and the high-voltage junction unit 300, assembly of which is completed, are seated on the upper part of the fuel cell stack 100 (S503). The high-voltage converter 200 and the high-voltage junction unit 300 are vertically coupled to the fuel cell stack 100. At this time, the plurality of coupling recesses 111a and 112a formed in the upper surface of the body 110 of the fuel cell stack 100, the connection recesses 211a of the plurality of first connection portions 211 formed at the second surface S22 of the high-voltage converter 200 and the opposite side (not shown) thereof, and the connection recesses 315a of the plurality of third connection portions 315 formed at the third surface S33 of the high-voltage junction unit 300 are coupled to each other in the state of being vertically aligned with each other.

The terminal portion 130 protruding from the upper surface of the body 110 of the fuel cell stack 100 may be inserted into the fuel cell output terminal receiving recess 311 formed in the bottom surface S31 of the high-voltage junction unit 300.

The high-voltage junction unit 300 according to the present disclosure has a structure configured to simultaneously receive and interconnect the input terminal of the high-voltage converter 200 and the output terminal of the fuel cell stack 100. Consequently, assembly and disassembly may be easily performed, whereby maintainability may be improved.

Figure 9:
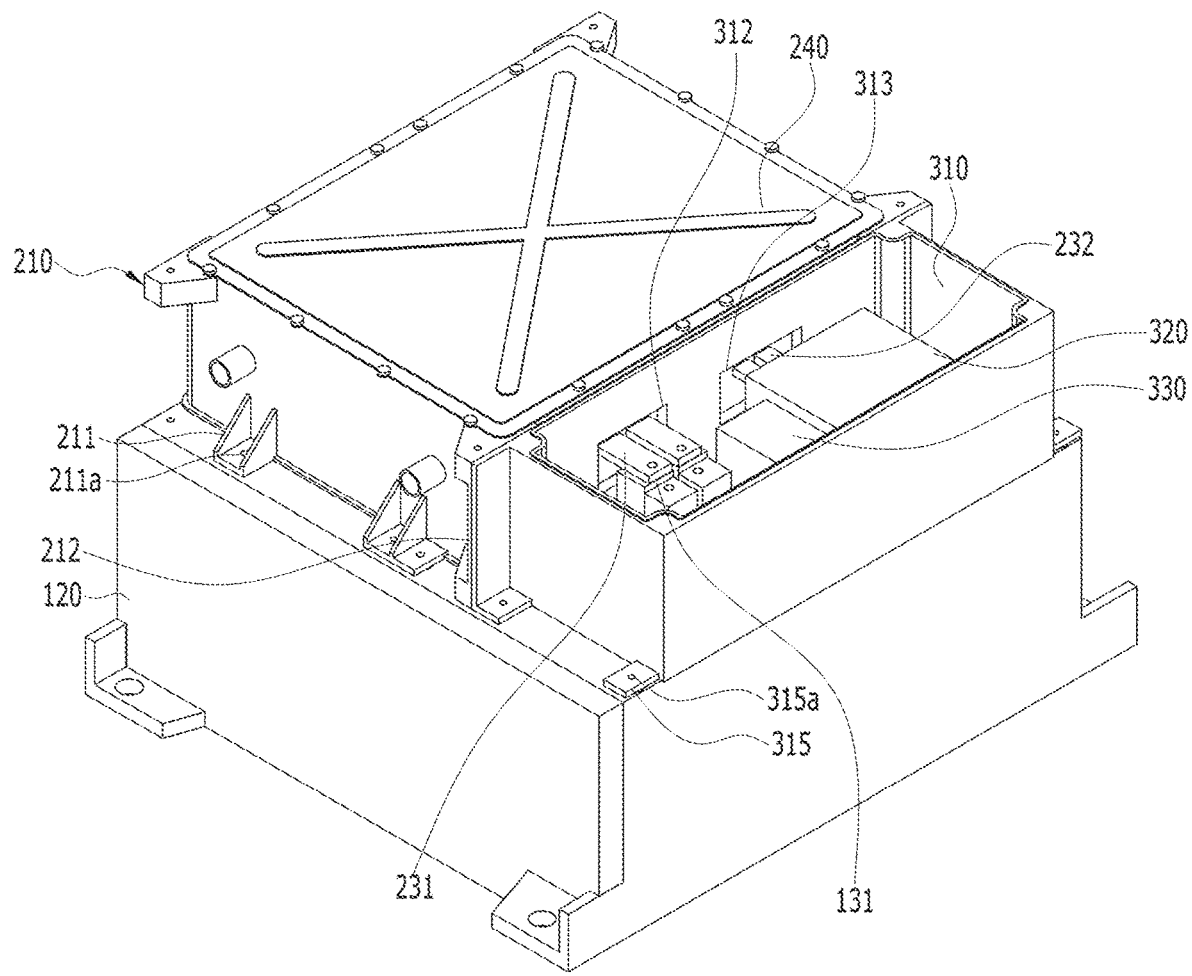
FIG. 9 is a perspective view showing the external appearance of the fuel cell system power supply according to the present disclosure after coupling is completed.

FIG. 9 is a perspective view showing the external appearance of the fuel cell system power supply according to the present disclosure. As shown, the converter input terminal portion 231 is inserted into the input terminal receiving recess 312 formed in the second surface S32 of the high-voltage junction unit 300 and is coupled to the output terminal 131 of the fuel cell stack 100, which is an element constituting the terminal portion 130 of the fuel cell stack 100 inserted into the fuel cell output terminal receiving recess 311 formed in the bottom surface S31 of the high-voltage junction unit 300. The stack end cell heater input terminal 132 of the fuel cell stack 100 may be directly connected to the output terminal 131 of the fuel cell stack 100 in the fuel cell output terminal receiving recess 311 (S504). The converter output terminal portion 232 inserted into the output terminal receiving recess 313 formed in the second surface S32 of the high-voltage junction unit 300 is coupled to a high-voltage bus bar 321 of the second circuit portion 320 (S505).

Figure 10:
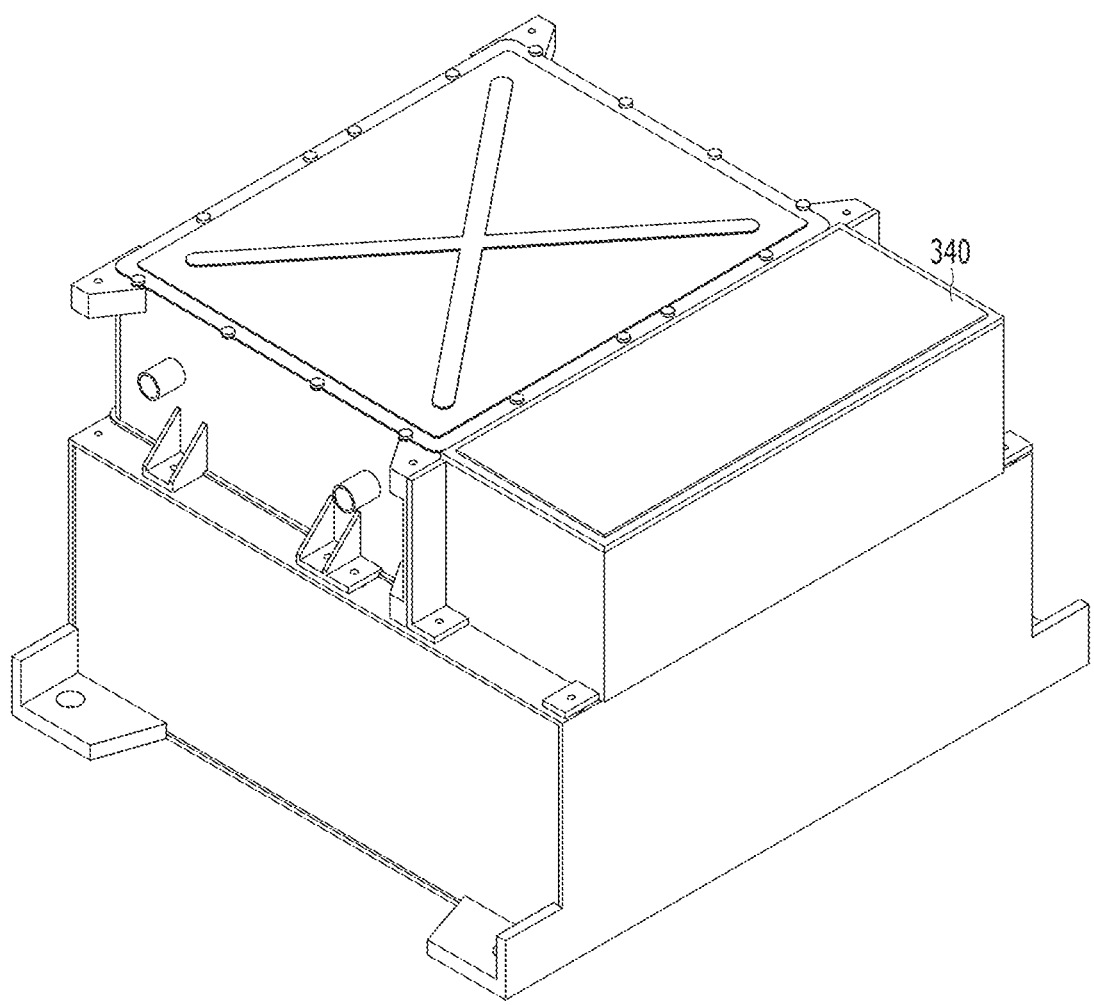
FIG. 10 is a perspective view showing the state in which assembly is completed by coupling a cover to the high-voltage junction unit in the state of FIG. 9.

In this state, the cover 340 of the high-voltage junction unit 300 may be fastened, as shown in FIG. 10, whereby assembly of the power supply may be completed.

As described above, the output terminal of the high-voltage converter and the output terminal and the stack end cell heater input terminal of the fuel cell stack may be simultaneously connected thereto in the fuel cell output terminal receiving recess. Consequently, the assembly structure of the high-voltage junction unit may be simplified, whereby productivity may be improved. In addition, maintainability may be improved, whereby it is possible to efficiently maintain a fuel cell vehicle.

As is apparent from the above description, in the high-voltage junction unit of the fuel cell system according to the present disclosure and the power supply of the fuel cell system including the same, the assembly structure thereof may be simplified, whereby productivity may be improved. In addition, maintainability may be improved, whereby it is possible to efficiently maintain a fuel cell vehicle.

Although the exemplary embodiments of the present disclosure have been described above with reference to the accompanying drawings, those skilled in the art will appreciate that the present disclosure can be implemented in various other embodiments without changing the technical ideas or features thereof.

What is claimed is:

1. A high-voltage junction unit of a fuel cell system, the high-voltage junction unit comprising:
   a fuel cell output terminal receiving recess on a first surface, such that an output terminal of a fuel cell stack extends into the fuel cell output terminal receiving recess;
   a high-voltage converter input terminal receiving recess disposed to be adjacent to the fuel cell output terminal receiving recess on a second surface perpendicular to the first surface, such that an input terminal of a high-voltage converter extends into the high-voltage converter input terminal receiving recess; and
   a high-voltage converter output terminal receiving recess spaced apart from the high-voltage converter input terminal receiving recess by a predetermined distance on the second surface, such that an output terminal of the high-voltage converter extends into the high-voltage converter output terminal receiving recess.

2. The high-voltage junction unit according to claim 1, further comprising:
   a first circuit portion configured to receive output power of the fuel cell stack; and
   a second circuit portion configured to receive output power of the high-voltage converter.

3. The high-voltage junction unit according to claim 2, wherein an input terminal of a first load connected to the first circuit portion extends to the fuel cell output terminal receiving recess.

4. The high-voltage junction unit according to claim 3, wherein the first load comprises a stack end cell heater.

5. The high-voltage junction unit according to claim 4, wherein an input terminal of the stack end cell heater is directly connected to the output terminal of the fuel cell stack in the fuel cell output terminal receiving recess.

6. The high-voltage junction unit according to claim 2, wherein the second circuit portion supplies power necessary for a driving motor, a blower power control unit, a coolant supply pump, and an air compressor.

7. The high-voltage junction unit according to claim 1, wherein the input terminal of the high-voltage converter is in a contact with the output terminal of the fuel cell stack in the fuel cell output terminal receiving recess.

8. A fuel cell system power supply comprising:
    a fuel cell stack configured to react hydrogen and oxygen in air with each other in order to generate electricity;
    a high-voltage converter configured to boost output power of the fuel cell stack by converting a lower voltage potential to a higher voltage potential; and
    a high-voltage junction unit configured to transmit the output power of the fuel cell stack to the high-voltage converter and to receive high-voltage power from the high-voltage converter,
    wherein the high-voltage junction unit has a structure into which an output terminal of the fuel cell stack and an input terminal of the high-voltage converter extend,
    wherein the high-voltage junction unit comprises:
        a first circuit portion configured to receive the output power of the fuel cell stack;
        a second circuit portion configured to receive the output power of the high-voltage converter; and
        an input terminal of a stack end cell heater connected to the first circuit portion.

9. The fuel cell system power supply according to claim 8, wherein the output terminal of the fuel cell stack and the input terminal of the high-voltage converter are in a contact with each other and extend into the high-voltage junction unit in a vertical direction.

10. The fuel cell system power supply according to claim 8, wherein the input terminal of the stack end cell heater is connected to the output terminal of the fuel cell stack in the high-voltage junction unit.

11. The fuel cell system power supply according to claim 8, wherein the second circuit portion supplies power necessary for a driving motor, a blower power control unit, a coolant supply pump, and an air compressor.

12. A method of manufacturing a fuel cell system power supply, the method comprising:
    separating a cover from a high-voltage junction unit;
    assembling a high-voltage converter and the high-voltage junction unit;
    seating the assembled high-voltage converter and high-voltage junction unit on a fuel cell stack;
    fastening an output terminal of the fuel cell stack and an input terminal of the high-voltage converter to each other;
    fastening an output terminal of the high-voltage converter to a bus bar of the high-voltage junction unit;
    connecting an input terminal of a stack end cell heater of the fuel cell stack to an output power using end of the fuel cell stack; and
    assembling the cover to the high-voltage junction unit.

13. The method according to claim 12, wherein the assembling the high-voltage converter and the high-voltage junction unit comprises inserting a high-voltage input terminal and a high-voltage output terminal of the high-voltage converter respectively into an input terminal receiving recess and an output terminal receiving recess at one side of the high-voltage junction unit in a horizontal direction.

* * * * *